(12) United States Patent
Akst

(10) Patent No.: US 6,192,342 B1
(45) Date of Patent: Feb. 20, 2001

(54) AUTOMATED CAMERA AIMING FOR IDENTIFIED TALKERS

(75) Inventor: Adam Akst, Cedar Park, TX (US)

(73) Assignee: VTEL Corporation, Austin, TX (US)

( * ) Notice: Under 35 U.S.C. 154(b), the term of this patent shall be extended for 0 days.

(21) Appl. No.: 09/193,828

(22) Filed: Nov. 17, 1998

(51) Int. Cl.$^7$ .............................. G10L 11/02; G10L 15/02
(52) U.S. Cl. ........................... 704/275; 704/246; 704/231
(58) Field of Search .................................. 704/270, 275; 379/93.14, 93.21; 380/257; 713/153; 348/15, 211, 17, 213

(56) References Cited

U.S. PATENT DOCUMENTS

| | | | |
|---|---|---|---|
| 4,264,928 | * | 4/1981 | Schober .................................. 348/15 |
| 4,531,024 | * | 7/1985 | Colton et al. ....................... 379/93.14 |
| 5,469,529 | * | 11/1995 | Bimbot et al. ......................... 704/246 |
| 5,794,204 | * | 8/1998 | Miyazawa et al. ................... 704/275 |
| 5,959,667 | * | 9/1999 | Maeng .................................... 348/15 |

OTHER PUBLICATIONS

Serial No. 09/187248, filed Nov. 6, 1998, entitled "Method and Apparatus for Reducing Camera Movements in a Video Conference System," naming Wayne J. Haas and Michael G. Lambert as inventors.

Serial No. 09/187,081, filed Nov. 6, 1998, entitled "Acoustic Source Location Using a Microphone Array," naming Pi Sheng Chang and Aidong Ning as inventors.

Serial No. 09/187,202, filed Nov. 6, 1998, entitled "Apparatus and Method for Avoding Invalid Camera Positioning in a Video Conference," naming Michael G. Lambert and Pi Sheng Chang as inventors.

* cited by examiner

Primary Examiner—Tālivaldis I. Šmits
Assistant Examiner—Daniel A. Nolan
(74) Attorney, Agent, or Firm—Skjerven Morrill MacPherson, LLP; Stephen A. Terrile

(57) ABSTRACT

A camera is targeted using voice recognition analysis. Audio information is received by a talker identification (TID) module from a microphone. The TID module automatically performs a voice recognition analysis on the audio information to uniquely identify which of a plurality of talkers is talking. The camera is automatically controlled to target a camera preset location corresponding to the talker identified to be talking.

17 Claims, 2 Drawing Sheets

AUTOMATED CAMERA AIMING FOR IDENTIFIED TALKERS

BACKGROUND

1. Field of the Invention

The present invention relates to camera presets, and, more particularly, setting a camera to view a talker based upon talker identification.

2. Description of the Related Art

Camera presets are used to help ensure that a correct talker is being viewed by a camera. Camera presets are typically implemented by manually setting pan, tilt and zoom parameters of each camera for each talker prior to the talker being recorded. For example, prior to a videoconference commencing, a camera operator focuses on each conference participant and causes a videoconference system to record the preset data for each camera for each participant. During the videoconference, the operator and/or a conference participant selects the proper camera preset depending on which talker is talking in the videoconference. Upon selection of a camera preset, the camera points and zooms to the preset location to view the talker corresponding to the camera preset. Although the implementation and use of manual presets are relatively simple, manual presets require considerable and ongoing operator intervention.

Another technique uses triangulation of sound to automatically point and zoom a camera to track and properly record a talker (e.g., a talking videoconference participant). Such a technique allows tracking the current talker even as the talker moves around a room. Such a technique is disclosed in U.S. patent application Ser. No. 09/187,081, filed Nov. 6, 1998, entitled "Acoustic Source Location Using A Microphone Array," naming Pi Sheng Chang, Aidong Ning, Michael G. Lambert and Wayne J. Haas as inventors, and which is incorporated herein by reference in its entirety. Although effective, such a technique can be relatively complex and expensive to implement.

SUMMARY

It has been discovered that a camera can be targeted to a talker using voice recognition based on the talker's known voiceprint. Such a method and system therefor provides a more efficient solution than manual presets while providing a simpler and more inexpensive solution than triangulation auto-tracking. Such a method and system therefor inexpensively provides robust tracking capabilities which are inherently immune to acoustic problems of most tracking techniques. Specialized hardware will typically not be required as sampling of microphone audio may be done through a sound card, and known voice recognition applications may be used.

In one embodiment, a method for targeting a camera uses voice recognition analysis. Audio information is received by a talker identification (TID) module from a microphone. The TID module automatically performs a voice recognition analysis on the audio information to uniquely identify which of a plurality of talkers is talking. The camera is automatically controlled to target a camera preset location corresponding to the talker identified to be talking.

In another embodiment, an apparatus for targeting a camera includes a camera targeting controller for automatically targeting a camera to one of a plurality of camera presets responsive to receiving audio information and identifying the audio information as corresponding to talker identification information which uniquely identifies a talker and which corresponds to the one of the camera presets.

In another embodiment, a method for targeting a camera includes saving talker/camera combination information for a talker/camera combination. The talker/camera combination information includes talker identification information for identifying the talker by voice and camera preset information corresponding to the location of the talker identified by the voice pattern. The method further includes the following: determining whether subsequent talker/camera combinations are to be saved; saving subsequent talker camera combinations if subsequent talker/camera combinations are to be saved; receiving first audio information; recognizing a first talker by determining whether the first audio information corresponds to first talker identification information of the saved talker identification information; determining first camera preset information corresponding to the first talker identification information; and targeting a camera preset location indicated by the first camera preset information.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following description is intended to provide a detailed description of an example of the invention and should not be taken to be limiting of the invention itself. Rather, any number of variations may fall within the scope of the invention which is defined in the claims following the description.

In one embodiment, a camera is targeted to a talker using voice recognition based on the talker's known voiceprint during a videoconference. Prior to the start of the videoconference, the camera is manually oriented and zoomed appropriately at each of the conference participants at the local site of the videoconference. When the camera is properly oriented towards a conference participant, he or she could talk e.g., says "My name is John, set preset"). A canned or custom voice recognition application can be used to qualify this sample and link the sample to camera preset information. For example, if audio information is channeled through a sound card, an available or custom-designed Windows-based application may be used to qualify the sample and save it for reference. The conference participant receives confirmation of the talker identification and camera preset (e.g., a visually displayed message such as "PRESET CONFIRMED" on the screen, an audible beep, etc.). After the camera preset information is correlated with the voice-recognition-based conference participant identification information, the camera positions itself to target the conference participant when his/her voice is detected and qualified. Also, graphical name and/or site identification information may be displayed on the screen under the conference participant from that point forward when the voice of the conference participant has been recognized and the camera has been targeted on the conference participant in accordance with the corresponding camera preset information. Additionally, switching and positioning speeds/modes, and methods of visually identifying the participant can be customized and configurable through the application.

Figure 1:
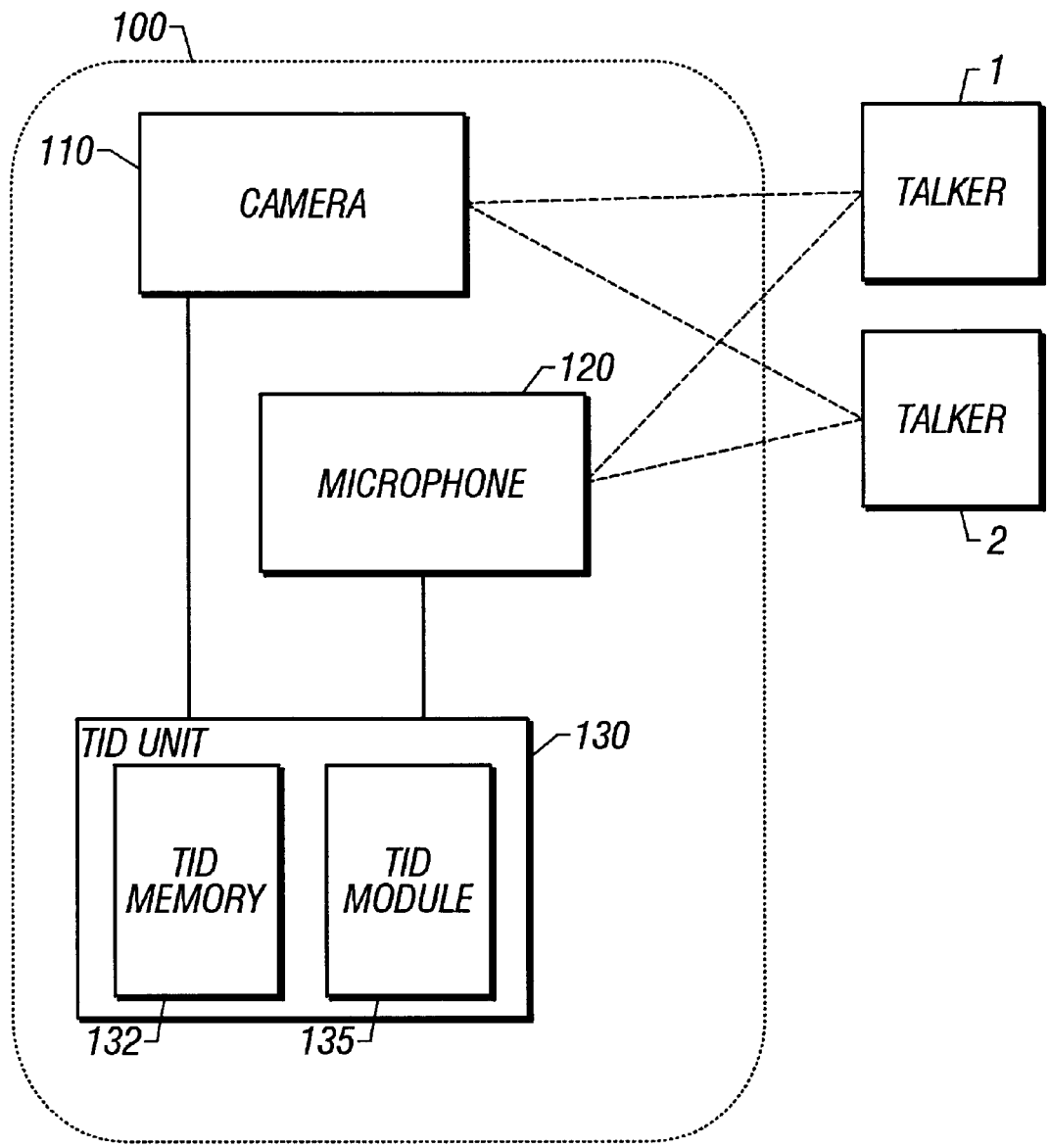
FIG. 1 shows a block diagram of one embodiment of a system in accordance with the invention.

Referring to FIG. 1, system 100 includes camera 110, microphone 120, and talker identification (TID) unit 130. An exemplary system 100 is a videoconference system. Microphone 120 is positioned to record voices of talker 1 and/or talker 2. Microphone 120 is coupled to provide audio information (e.g., an electrical representation of the voices of talker 1 and/or talker 2) to TID unit 130. Camera 110 is positioned to view images of talker 1 and/or talker 2. Camera 110 is coupled to provide video information (e.g., an electrical representation of the images of talker 1 and/or talker 2) to TID unit 130. TID unit 130 includes TID module 135 and TID memory 132.

During initialization, camera 110 is manually targeted an talker 1, for example, and microphone 120 records the voice of talker 1. TID module 135 receives audio information from microphone 120. TID module 135 determines TID reference information from the audio information. For example, TID module 135 includes a voice recognition program to determine a voice pattern to uniquely identify and/or differentiate the talker from other talkers. TID module 135 stores the TID reference information in TID memory 132. TID module 135 also receives camera preset information from camera 110. The camera preset information identifies the location of a talker (e.g., through pan, tilt and zoom information or other coordinate information). The camera preset information also identifies which camera is used to record the location of the talker, especially if multiple cameras are included in system 100. TID module 135 stores the camera preset information with corresponding TID reference information in TID memory 132, as further described hereinafter.

During operation, TID module 135 receives audio information from microphone 120 and accesses TID memory 132. By comparing the received audio information with the TID reference information stored in TID memory 132, TID module 135 identifies the talker that is talking and transmits the corresponding camera preset information to camera 110. If camera 110 is not already targeted on the identified talker's camera preset location, camera 110 targets the location identified by the camera preset corresponding to the identified talker to record the talker identified by TID module 135.

Figure 2:
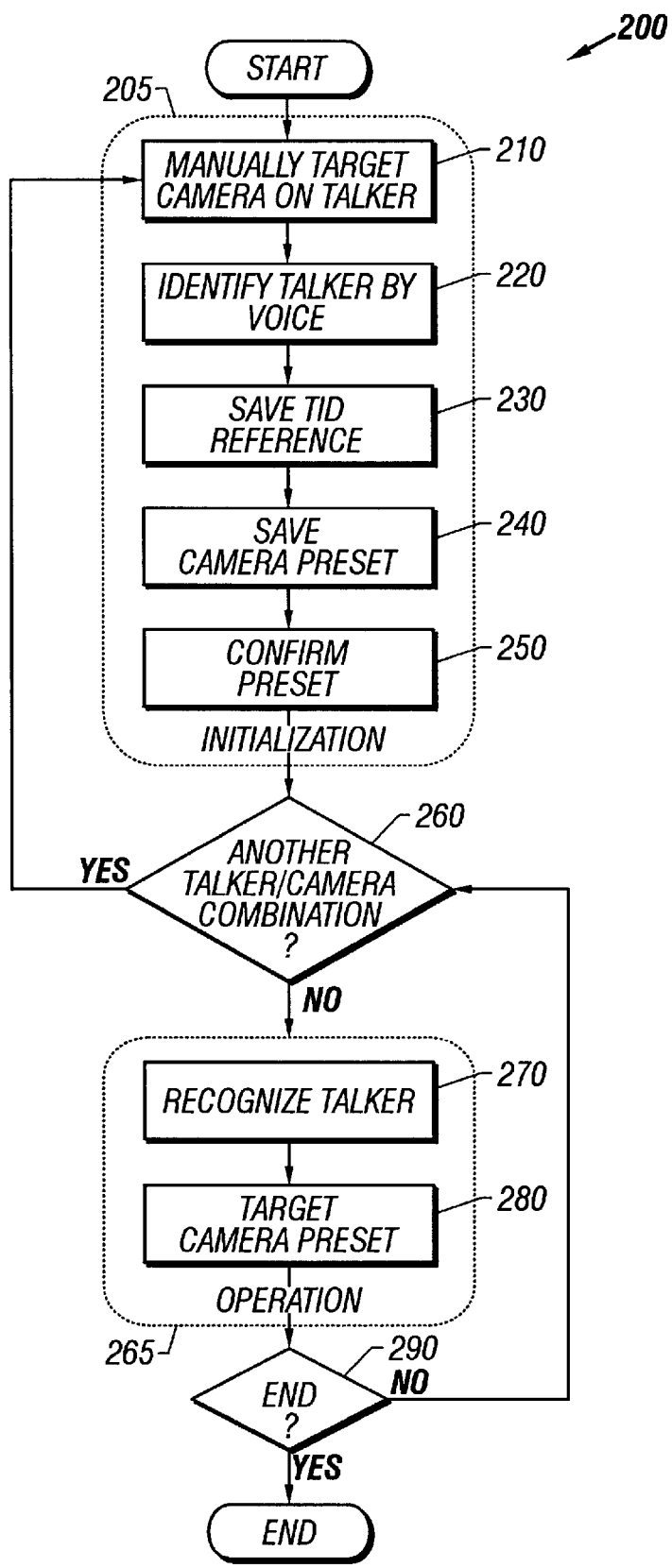
FIG. 2 shows a flow chart of the operation of one embodiment of a system in accordance with the invention.

The operation of TID module 135 is more specifically described below with reference to FIG. 2. FIG. 2 shows a flow chart of operations of one embodiment of the invention.

During initialization operation 205, various operations are performed to record camera preset and talker identification information for a particular talker/camera combination for subsequent use. For example, talker identification information identifying talker 1 is stored with corresponding camera preset information identifying camera 110 orientation and zoom parameters for targeting talker 1 for recording. In the embodiment of FIG. 1, TID memory 132 may store a talker/camera combination corresponding to camera 110 and talker 1 and a talker/camera combination corresponding to camera 110 and talker 2. In a multi-camera embodiment, TID memory 132 may also store a talker/camera combination corresponding to an additional camera and talker 1 and a talker/camera combination corresponding to the additional camera 110 and talker 2, for example. Thus, in a two camera, two speaker embodiment, up to four talker/camera combinations are possible.

After initialization operation 205 and during another talker/camera combination decision 260, it is determined via operator input whether a camera is to target another talker or a talker is to be added to another camera's talkers. For example, TID module 135 determines if camera 110 is to record camera preset information for another talker such as talker 2. If another talker/camera combination is to be defined, control returns to initialization operation 205. If no other talker/camera combination is to be defined, control transitions to execution operation 265.

During execution operation 265, various operations are performed to ensure that a camera is viewing the proper talker. For example, TID module 135 receives audio information, recognizes a talker (e.g., talker 1), and transmits camera preset information corresponding to the identified talker to camera 110.

After execution operation 265 and during end decision 290, it is determined whether recording of talkers is to be terminated. For example, TID module 135 determines if the videoconference is over. If the videoconference has not ended, control transitions to another talker/camera combination operation 260 which is described above.

As described above, initialization operation 205 includes various operations for recording camera preset and talker identification information for a particular talker/camera combination. For example, during manual target operation 210, a camera is manually targeted on a talker. For example, a camera operator manually targets camera 110 to record talker 1. Targeting a camera includes pointing a camera in a direction towards the target (e.g., talker 1) and zooming to the proper distance towards the target.

After identify talker operation 210 and during identify talker operation 220, the voice of a talker is captured and a voice pattern is derived therefrom for subsequent identification of the talker. For example, microphone 120 records the voice of talker 1 and provides audio information of the voice of talker 1 to TID module 135. TID module 135 generates TID reference information such as a voice pattern for subsequent identification of talker 1 when talker 1 speaks during a videoconference. Any voice recognition technique known in the art may be used.

After identify talker operation 220 and during save TID reference operation 230, TID reference information is stored for subsequent comparison with real-time or substantially real-time samples of various talkers. For example, TID module 135 stores TID reference information for identifying the voice of talker 1 in TID memory 132.

After save TID reference operation 230 and during save camera preset operation 240, information relating to the targeting of a camera is recorded with corresponding TID reference information. For example, camera preset information identifying the position and zoom of camera 110 while targeted on talker 1 (e.g., targeted while microphone 120 recorded the voice of talker 1 during identify talker operation 220) is stored in TID memory 132 and corresponds to the talker 1 TID reference information stored in TID memory 132.

After save camera preset operation 240 and during confirm preset operation 250, TID module 135 confirms to system users that TID reference information and corresponding camera preset information identifying a talker/camera combination has been stored in TID memory 132.

After confirm preset operation 250, control transitions to another talker/camera combination decision 260 which is described above. If no other talker/camera combination is to be defined, the videoconference is ready to begin and control transitions to recognize talker operation 270.

During recognize talker operation 270, TID module receives audio information from microphone 120. TID module compares the audio information received with the TID reference information stored in TID memory 132 for a match to determine which talker is talking in the videoconference. If a match is found, then the camera preset information corresponding to the matched TID reference information is transmitted to camera 110.

After recognize talker operation 270 and during target camera preset operation 280, camera 110 receives camera preset information. If camera 110 is not already targeting the location/talker identified by the received camera preset information, camera 110 automatically targets (e.g., pans, tilts and zooms) the identified camera preset location to record the talker which was identified by TID module 135 as the current talker in the videoconference at the local site. After target camera preset operation 280, control transitions to end decision 290 which is described above.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, although the exemplary system 100 is described above as a video conference system, system 100 may be any type of system in which multiple talkers are viewed or recorded by cameras. In a videoconference embodiment, TID unit 130 may be a computer system or a coder/decoder box ("codec") or a portion of a computer system or codec. Furthermore, the operations described above and/or shown in FIG. 2 may be implemented as software executable by a computer system or codec. In another embodiment, TID unit 130 and/or TID module 135 may be a special purpose or general purpose microprocessor or microcontroller operating under control of firmware or software modules. In another embodiment, TID unit 130 and/or TID module 135 is a software module operating on a personal computer system, microprocessor or microcontroller. In another embodiment, TID unit 130 and/or TID module 135 is a computer system, microprocessor or microcontroller operating under control of one or more of the above described modules. Thus, the operations of TID unit 130 and/or TID module 135 described herein may be executed at least in part on one or more microprocessors included within one or more computer systems and/or talker recording systems such as a videoconference system and/or equipment therefor.

In one embodiment, TID unit 130 and/or TID unit 130 is an information processing system such as a personal computer system. Other embodiments may include different types of computer systems. Computer systems are information handling systems which can be designed to give independent computing power to one user or a plurality of users. Computer systems may be found in many forms including but not limited to minicomputers, workstations, servers, personal computers, notepads and embedded systems. A typical computer system includes at least one processing unit, associated memory and a number of input/output (I/O) devices. A computer system processes information according to a program and produces resultant output information via the I/O devices. A program is a list of internally stored instructions such as a particular application program and/or an operating system. A software module may includes a program.

TID memory 132 of TID unit 130 may be any type of memory or combination of memory types and control circuits thereof. For example, TID memory 132 may include active memory (e.g., random access memory) and long term memory such as magnetic disk storage of a computer system (e.g., TID unit 130).

Some of the above described operations may be implemented using software modules. Various embodiments may use different source code and/or computer programs and instructions thereof to implement the software modules. Various embodiments may use non-software based control methods such as application specific hardware and/or firmware implementations. For example, in one embodiment, TID unit 135 and/or TID module 135 is a software module. In such an embodiment, TID memory is memory space associated with a process of TID unit 135. In another embodiment, TID unit 135 and/or TID module 135 is an application specific hardware module. In another embodiment, TID unit 135 and/or TID module 135 includes a firmware module. In another embodiment, TID unit 135 and/or TID module 135 includes a combination of various types of modules. For example, TID module 135 may include a software program executing on a processor which receives audio information from an application specific hardware module for processing audio information. Thus, a module may include software, hardware or a combination thereof.

Referring to FIG. 2, some or all of operations 205–290 may occur in a parallel or pipelined fashion. Also, where appropriate, the order of the operations may be changed. For example, operations 230 and 240 may occur simultaneously, or operation 240 may occur before operation 230. Also, some operations may be eliminated. For example, although confirm preset operation 250 is presently preferred, confirm preset operation 250 may be eliminated from the flow of FIG. 2. to increase simplicity of implementation.

Those skilled in the art will recognize that boundaries between logic blocks are merely illustrative and that alternative embodiments may merge logic blocks or impose an alternate decomposition of functionality upon various logic blocks. For example, TID unit 130, microphone 120 and camera 110 may be integrated within a single information processing system such as a videoconferencing system. Also for example, TID module 135 may be decomposed into an audio information receipt and processing module, and a camera control module. Furthermore, those skilled in the art will recognize that boundaries between the functionality of the above described operations are merely illustrative. The functionality of multiple operations may be combined into a single operation, and/or the functionality of a single operations may be distributed into additional operations in accordance with the invention. Also, the functionality of a module may be decomposed such that the module includes modules and/or submodules.

Moreover, alternative embodiments may include multiple instances of a particular component. For example, although an embodiment has been described including a single camera and a single microphone, other embodiments may include different numbers of cameras and microphones.

As used herein, camera preset information includes information for identifying a location to be viewed by a camera. For example, the location may be identified using information regarding the state of the camera (e.g., pan, tilt, zoom parameters) and/or information regarding the location of the focus point of the camera (e.g., cartesian or polar coordinates of the targeted location referenced from a reference point such as the location of the camera, microphone, etc.).

The above description is not intended to present an exhaustive list of embodiments of the invention. Although an attempt has been made to outline some exemplary variations, other variations are within the scope of invention as defined in the claims below.

What is claimed is:

1. A method for targeting a camera, the method comprising:
   receiving audio information by a talker identification (TID) module from a microphone;
   automatically performing by the TID module a voice recognition analysis on the audio information to uniquely identify which of a plurality of talkers is talking by the voice pattern; and
   automatically controlling the camera to target a camera preset location corresponding to said talker identified to be talking.

2. The method of claim 1, the method further comprising a plurality of initialization operations, the initialization operations comprising:
   manually targeting a camera to a location of a talker;
   saving camera preset information corresponding to the location of the talker after the camera is manually targeted to the talker;
   using a microphone to obtain audio information regarding a voice of the talker;
   saving TID information identifying the talker after obtaining the audio information, wherein the camera preset information and the TID information are saved to identify a talker/camera combination.

3. The method of claim 2 wherein
   the camera is one of a plurality of cameras;
   the method further includes manually targeting each camera to a location of a talker;
   repeating the initialization operations for each camera so that camera preset information and TID information are saved to identify a talker/camera combination corresponding to each camera.

4. The method of claim 2, the method further comprising:
   repeating the initialization operations for each talker of a plurality of talkers so that camera preset information and TID information are saved to identify each of a plurality of talker/camera combinations corresponding to each talker.

5. The method of claim 4 wherein
   the automatically performing by the TID module a voice recognition analysis includes comparing the received audio information to the TID information to identify a talker corresponding to the received audio information; and
   the automatically controlling the camera to target a camera to the camera preset location includes targeting the camera to the location identified by the camera preset information which corresponds to the talker corresponding to the received audio information.

6. The method of claim 2 wherein the initialization operations further comprise:
   repeating the initialization operations responsive to operator input.

7. The method of claim 2 further comprising:
   confirming that the talker/camera combination has been saved.

8. An apparatus for targeting a camera, the apparatus comprising:
   a camera targeting controller for automatically targeting a camera to one of a plurality of camera presets responsive to receiving audio information and identifying the audio information as corresponding to talker identification information which uniquely identifies a talker from a plurality of talkers by the voice pattern and which corresponds to the one of the camera presets.

9. The apparatus of claim 8 further comprising:
   a computer-readable storage medium; and wherein
   the camera targeting controller is a software module store on the computer-readable storage medium.

10. The apparatus of claim 9 further comprising:
    an information processing system, the information processing system including the computer-readable storage medium.

11. The apparatus of claim 10 wherein the information processing system is a general purpose personal computer system.

12. The apparatus of claim 10 wherein the information processing system is a videoconference system.

13. The apparatus of claim 8 wherein the apparatus is a videoconference system comprising:
    a camera;
    a microphone;
    an information processing unit, the information processing unit comprising the camera targeting controller, the information processing unit being coupled to receive the audio information from the microphone, the information processing unit being coupled to receive camera preset information from the camera when the camera is initially targeted on a talker and audio information corresponding to the talker is initially received.

14. The apparatus of claim 8 wherein the camera targeting controller comprises:
    a talker identification module, the talker identification module generating the talker identification information by performing a voice recognition analysis on the audio information responsive to receiving the audio information; and
    a talker identification memory, the talker identification module storing the talker identification information corresponding to the received audio information responsive to receiving the talker identification information, the talker identification module storing camera preset information responsive to receiving the camera preset information, the camera preset information identifying a location to be targeted by the camera responsive to the talker identification module receiving talker identification information corresponding to the camera preset information.

15. A method for targeting a camera, the method comprising:
    saving talker/camera combination information for at least one of a plurality of talker/camera combinations, the talker/camera combination information including talker identification information for identifying a talker by voice and camera preset information corresponding to the location of said talker identified by the voice pattern;
    determining whether subsequent talker/camera combinations are to be saved;
    saving subsequent talker camera combinations if subsequent talker/camera combinations are to be saved;
    receiving first audio information;
    recognizing a first talker by determining whether the first audio information corresponds to first talker identification information of the saved talker identification information;
    determining first camera preset information corresponding to the first talker identification information;
    targeting a camera preset location indicated by the first camera preset information.

16. The method of claim 15 further comprising:

manually targeting a camera on a talker;

determining the camera preset information corresponding to the talker after manually targeting the camera on the talker recording a voice of the talker; and generating the talker identification information by processing the voice of the talker to uniquely identify the talker by voice.

17. The method of claim 15 wherein the recognizing the first talker by determining whether the first audio information corresponds to the first talker identification information includes automatically performing a voice recognition analysis on the first audio information to uniquely identify which of a plurality of talkers is talking.

* * * * *